July 17, 1934.                    T. W. PAUL                    1,966,679
                                 HITCH DEVICE
                              Filed July 13, 1931
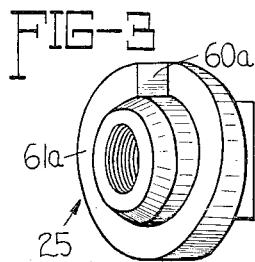
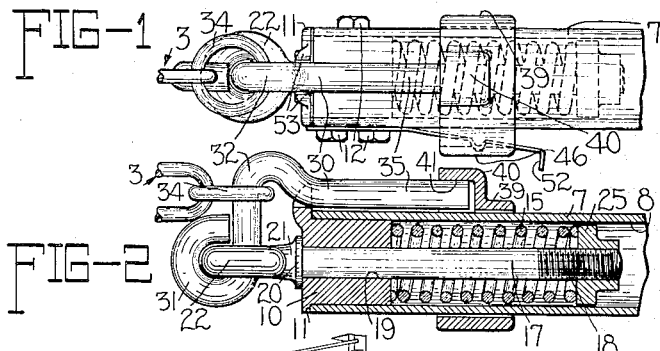
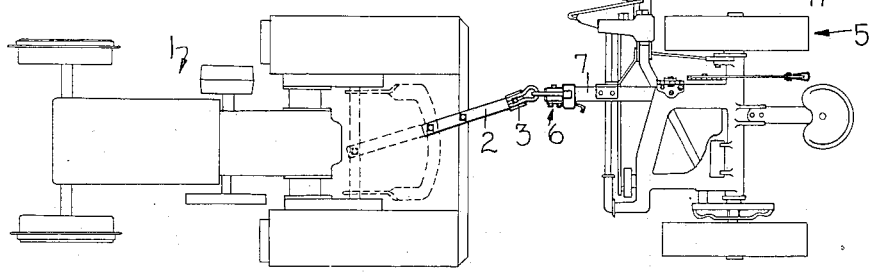
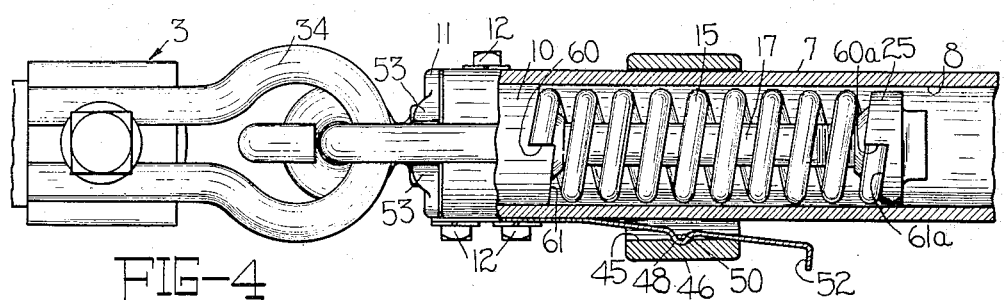
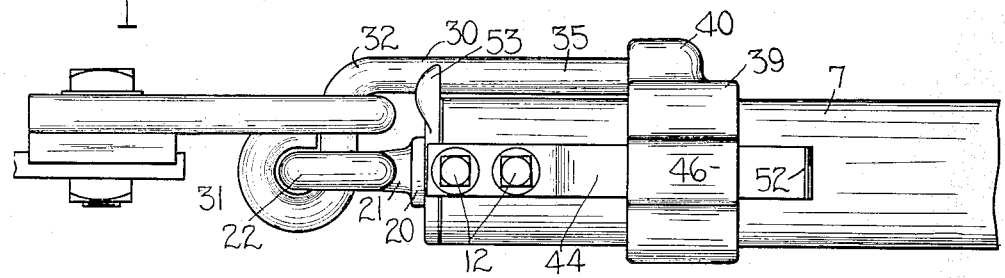
INVENTOR.
Talbert W. Paul
BY Brown, Jackson
Boettcher & Dienner
ATTORNEYS.
WITNESS.
Edward Melin.

Patented July 17, 1934

1,966,679

UNITED STATES PATENT OFFICE 1,966,679

HITCH DEVICE

Talbert W. Paul, Moline, Ill., assignor to Deere & Company, Moline, Ill., a corporation of Illinois Application July 13, 1931, Serial No. 550,411

9 Claims. (Cl. 280—33.16)

The present invention relates generally to improvements in hitch devices for operatively connecting a load with a drawing element and is a division in part of my copending application, Serial No. 517,169, filed February 20, 1931, for a Hitch mechanism.

The present invention has for its principal purpose the provision of a hitch mechanism of the spring relief type wherein the load resisting spring means and associated parts can be easily and conveniently adjusted to vary the tension of the said spring means. More specifically, the present invention contemplates a spring relief hitch device including a pair of relatively movable members with a coil spring biased therebetween for the purpose of resisting relative movement between the members, one of the members carrying a nut and the spring being fixed with respect to the nut and to the other member so that the first member can be rotated to vary the tension of said spring.

Another object of the present invention is to provide a spring relief hitch device which is so arranged that the same may be manually operable to quickly detach the load from the drawing element. Another object of the present invention is to provide a removable spring relief mechanism which can be removed as a unit from its support within one of the draft members without disturbing the relation between the spring and associated parts.

Other objects and advantages of the present invention will be apparent to those skilled in the art after a consideration of the following detailed description of the preferred structural embodiment taken in conjunction with the accompanying drawing in which:

Figure 1 is a top plan view of my improved spring relief mechanism associated with a tubular draft tongue.

Figure 2 is a vertical section taken approximately through the longitudinal center of Figure 1;

Figure 3 is an enlarged perspective view of the inner abutment or nut member which is adapted to be threaded onto the inner end of the slidable and rotatable draft bolt;

Figure 4 is an enlarged top view, certain parts being broken away, of a slightly modified form of hitch device;

Figure 5 is a vertical elevation of the device shown in Figure 4; and

Figure 6 is a top plan view of a drawing element in the form of a tractor and a load in the form of a mower connected together by a connection embodying my improved spring relief hitch device.

Referring now to the drawing, the reference numeral 1 indicates a drawing element in the form of a tractor. The drawbar 2 of the tractor is provided with a hitch connection at the rear thereof which is connected to a mower 5 through my improved spring relief hitch device, indicated in its entirety by the reference numeral 6.

The draft tongue 7 of the mower is preferably a tubular member having a central longitudinal bore 8 which is closed at the forward outer end by a cylindrical abutment block 10. The abutment block 10 has a peripheral flanged end 11 and is held in the bore 8 by a plurality of bolts or similar means 12 which are threaded through the tongue 7 and into the abutment block 10. The tongue 7 forms an enclosing housing for the compression spring 15 of the spring relief hitch device so that dirt and rain are prevented from entering the end of the tongue 7 due to the snug relationship of the abutment block 10 in the end of the tubular draft member 7.

The majority of the parts of my improved spring relief hitch device are carried by the cylindrical block 10 so that the removal of the block 10 from the tongue 7 effects the removal of the entire spring relief unit. A slidable and rotatable member in the form of a draft bolt 17 having an inner threaded end 18 passes longitudinally through a central opening 19 in the abutment block 10. The draft bolt 17 includes at its forward end an abutment shoulder or flange 20 which abuts against the exterior end of the block 10 to limit the inward movement of the draft bolt 17. The flanged portion 20 of the draft bolt 17 converges into a neck 21 which terminates in an eye 22. The opposite threaded end of the draft bolt 17 receives an abutment member or nut 25. The compression spring 15 encircles the draft bolt 17 and is biased between the cylindrical abutment member 10 and the nut member 25. In Figure 2 the ends of the compression spring 15 are flattened to lie snugly against the block 10 and the nut 25, respectively.

The eye 22 of the draft bolt 17 pivotally carries an arm 30 for swinging movement relative thereto in a vertical plane. The arm 30 has an eye 31 engaged within the eye 22 formed on the draft bolt 17, and the arm 30 also is provided with a portion 32 which is bent or looped to act as an eye to receive the rear link 34 of the hitch or draft connection 3 on the tractor drawbar 2. The swinging arm 30 is also provided with a rear portion 35 which extends rearwardly along the draft member 7.

A peripheral collar or sleeve 39 is slidably mounted upon and encircles the forward end of the tubular draft member 7. The collar 39 includes a raised portion or boss 40 which forms a pocket 41 acting as an abutment to receive the rearward end 35 of the arm 30. The slidable collar 39 is releasably held in a relatively fixed position on the draft member 7 by means of a flat or leaf spring 44 the forward end of which is secured beneath two of the removable bolts 12 as best shown in Figures 1 and 5. This spring or spring finger 44 passes through a channel or slot 45 in an enlarged side portion 46 of the sleeve or collar 39. The inner wall of the slot 45 includes a depression 48 in which a curve or hump 50 formed in the spring 44 engages. The spring finger 44, in passing longitudinally through the slot 45, prevents the sleeve or collar 39 from turning relative to the tongue or draft member 7 and also prevents the collar from moving longitudinally of the draft member as long as the hump 50 is engaged in the depression 48, but the sleeve 39, however, can be moved longitudinally of the draft member upon release of the hump or detent 50 from the depression 48.

In order to prevent the sleeve 39 from moving too far rearwardly of the draft member 7 after the detent 50 has been pressed out of engagement with the depression 48 the spring finger 44 is formed with a turned end 52. The end 52 also serves as a convenient means for manually depressing the spring 44 to release the collar 39 at any time the operator desires to do so. The collar 39 is also prevented from moving forwardly off of the draft member 7 by means of the bolts 12 and also by means of a pair of upstanding lugs 53 which lie on opposite sides of the arm 30.

It is apparent that the longitudinally shiftable collar or sleeve 39 furnishes a very convenient means for quickly detaching the hitch connection 3 from the forward end of the draft tongue 7. All the operator has to do is to press the spring finger 24 inwardly to release the collar 39 and then the latter may be slid rearwardly against the end 52 to cause the abutment 41 on the collar 49 to clear the rear end of the arm 35. When this is done the arm 35 may be swung upwardly and the loop or link 34 then disconnected therefrom.

To hitch the draft tongue 7 to the tractor 1, the link 34 of the hitch connection 3 is then passed over the arm 35, the link 34 being received within the loop 32. When this is done the arm 35 is then brought down against the draft member 7 between the guide lugs 53 and the rear end engaged beneath the abutment 41 of the pocket 40, the spring finger 44 causing the hump or detent 50 to engage in the depression 48 to hold the collar 39 in position. In ordinary operation the compression spring 15 can resist the usual draft transmitted therethrough, but when an unusual obstacle or load is encountered by the implement 5, the spring 15 will be compressed to such an extent that the draft bolt 17 will move outwardly of the block 10 a sufficient amount so that the arm 35 will be withdrawn from the pocket 40. Consequently the link 34 will be released to instantly interrupt the transmission of draft from the tractor or drawing element 1 and the load 5.

It is frequently desirable to be able to adjust the tension of the spring 15 so as to vary the load under which the arm 30 will be released. In the present structure this is conveniently accomplished by disengaging the sleeve 39 from the arm 30, detaching the link 34 from the arm, and lastly using the arm 30 as a means for turning the draft bolt 17. Since the spring 15 has a fairly wide bearing on the relatively fixed abutment block 10 and the nut member 25 rotation of the draft bolt will cause the nut 25 to be threaded further onto the bolt or farther off of it, depending upon which way the bolt is turned. It is to be observed that since the spring 15 is operative at all times to hold the flange 20 against the forward end of the block 10, adjustment of the nut 25 along the bolt to increase or decrease the tension of the spring 15 does not have any effect upon the relative positions of the two interengaging members, namely, the arm 30 and the sleeve 39.

Under certain conditions it may become necessary to positively hold the nut member 25 from rotating when the bolt 17 is turned by means which is more positively acting than the force of friction between the ends of the spring and the respective abutments as shown in Figure 2. Under such conditions the present invention contemplates the provision of cooperating means acting between the respective ends of the spring and the abutment block and nut member for positively holding the nut member from rotating when the draft bolt is turned to adjust the tension of the compression spring.

Referring now more particularly to Figures 4 and 5, it will be observed that the spring 15 shown in these figures is a left-hand helix instead of a right hand helix as is the spring shown in Figure 2. It is also to be observed that the abutment block 10 is notched to provide an abutment shoulder 60, see Figure 4, against which the forward end of the left hand spring 15 is received. This notch 60 is formed in the block 10 by virtue of the formation of a helical surface 61 which in diameter and pitch corresponds to the pitch of the coils of the spring 15. By virtue of this construction, therefore, not only is the abutment face 60 formed but also the surface 61 forms a firm seat against which the forward end of the spring 15 rests.

The nut member 25 shown in Figures 4 and 5 is formed in a manner similar to the cylindrical abutment block 10. The nut member is best shown in Figure 3 and is also provided with a helical surface 61a corresponding in diameter and pitch to the turns of the spring 15, which member terminates in a perpendicular face 60a against which the rearward end of the spring 15 is received, as best shown in Figure 4. It will be observed from Figure 4 that the abutment faces 60 and 60a are so arranged that when the draft bolt 17 is turned to compress the spring 15 any tendency for the nut 25 to turn with the bolt will be resisted by virtue of the abutting relation between the face 60a and the end of the spring 15, and the spring itself cannot turn in that direction because the other end of the spring abuts directly against the face 60 on the block 10 which is securely fastened to the tongue 7. It is also true that when the bolt 17 is turned in the opposite direction to loosen the spring 15 any tendency for the nut 25 to follow the bolt 17 will be resisted because the surface 61a is inclined with respect to the spring end, and the same is true of the forward end of the spring 15 relative to the surface 61 on the abutment block 10. In this way, therefore, the nut member 25 is fixed relative to one end of the compression spring while the other end of the compression spring is fixed relative to the draft member 7. In addition, by virtue of the helical surfaces formed on the abutment block head and the nut 25 the springs 15 are less expensive to manufacture in that no flattened ends are necessary.

From the foregoing description it will be seen that a spring relief draft transmitting device which is capable of adjustment without disturbing any of the other parts and that the yielding hitch means can be removed as a unit from the draft tongue without disturbing the adjustment of the spring. It will also be seen that by virtue of the slidable collar 39 and associated structure the hitch connection may be readily detached, yet the construction is such that the collar or sleeve is securely held in position during normal operation of the device.

What I claim, therefore, and desire to secure by Letters Patent is:

1. A hitch device comprising, in combination, a draft member, an abutment member at one end of said draft member, a draft bolt slidably and rotatably mounted relative to said abutment member, a nut threaded onto the end of said bolt, and a spring biased between said abutment member and said nut and positively fixed against rotation relative to both the abutment member and the nut whereby rotation of the draft bolt is effective to adjust the tension of said spring.

2. A hitch device comprising a draft member, an abutment member secured to the other end of the draft member, a draft bolt slidably and rotatably received by said abutment member and having an inner threaded end, a nut member threaded onto the inner end of said draft bolt and having a shouldered projection formed thereon, and a spring biased between the abutment member and said nut member, one end of the spring being in abutting relation with respect to the shoulder on said nut member, whereby turning of the draft bolt in the nut member to adjust the tension of said spring will not cause the nut member to turn relative to the spring.

3. A hitch device comprising a draft member having an abutment block at its outer end, there being an opening in said block, a draft bolt rotatable and slidable in the opening in said block and extending longitudinally of the draft member, a nut threaded onto the inner end of said draft bolt, a coil spring encircling said draft bolt and biased between the abutment block and said nut, and cooperating means on the respective ends of said spring and the block and nut to prevent the nut from turning with the draft bolt when the latter is turned relative to the nut to adjust the tension of said spring.

4. A hitch device comprising a draft member having an abutment at one end, a draft bolt shiftable relative to said abutment, a second abutment on the inner end of the draft bolt, and a coil spring positioned between said abutments, each of said abutments having their adjacent faces formed with a helical surface corresponding in pitch to the coils of said spring.

5. The combination with an implement comprising a frame and a forwardly extending tongue rigid with said frame for pulling and guiding said implement, said tongue comprising a tubular member, of a spring release hitch mechanism housed in the bore of said tubular member in the end of said member, said hitch mechanism including a spring disposed within said tubular member and a stationary portion closing the end of said member to completely enclose the spring of said mechanism within said member.

6. The combination with an implement comprising a frame and a forwardly extending tongue rigid with said frame for pulling and guiding said implement, and a spring release mechanism comprising a stationary member fixed to the end of said tongue, a draft bolt shiftable and rotatable relative to said stationary member, a nut threaded on the inner end of said bolt, a spring disposed between said stationary member and said nut, said nut being held against rotation relative to said stationary member, an arm pivotally carried by the outer end of said draft bolt and having an end extending rearwardly, a sleeve slidable on said tongue and including a portion receiving the rearward end of said arm, and a hitch connection linked to said arm, of a pair of lugs on said stationary member and spaced laterally to receive said arm therebetween to transmit lateral and torsional stresses from said hitch connection through said arm and said stationary member directly to said tongue, to prevent such stresses from being transmitted to said sleeve and to prevent such stresses from turning said draft bolt relative to said nut.

7. In a spring release device comprising a stationary portion, a draft member movable relatively to said stationary portion and yieldingly held in a certain position with respect thereto, an arm pivoted to said draft member, a member adjustable relative to said stationary member and having a portion adapted to receive the free end of said arm, a spring finger fixed to said stationary member and having a detent adjacent one end thereof for yieldingly holding said adjustable member in proper position, said one end having an upturned portion for limiting the movement of said adjustable member relative to said stationary member.

8. In a spring release device comprising a stationary portion, a draft member movable relatively to said stationary portion and yieldingly held in a certain position with respect thereto, an arm pivoted to said draft member, means carried by said stationary portion for holding the arm in one position with respect thereto, a member adjustable relative to said stationary member and having a first portion adapted to receive the free end of said arm, a spring finger fixed to said stationary member, said adjustable member having a second portion adapted to receive said spring finger, said finger being arranged on the stationary member and said second portion on the adjustable member cooperating with said spring finger for holding the adjustable member in position so that said first portion thereof is always disposed in a position to receive the free end of said arm when held in position by said holding means.

9. In a spring release device comprising a stationary portion, a draft member movable relatively to said stationary portion and yieldingly held in a certain position with respect thereto, an arm pivoted to said draft member and adapted in one position to be disposed longitudinally of said stationary portion, means carried by said stationary portion for holding the arm in longitudinal position, a spring finger fixed to said stationary member and extending in parallelism with respect to said arm when the latter is held in said position, an adjustable member slidable on said stationary member and having a portion adapted to receive the free end of said arm when in said one position and a portion receiving said spring finger, said spring finger cooperating with said adjustable member for holding the latter in a position to receive the free end of said arm, and means carried by said spring finger for limiting the movement of said adjustable member relative to said stationary member.

TALBERT W. PAUL.